Nov. 5, 1957 G. H. McLAFFERTY 2,811,828
BLEED MEANS FOR CONFINED SUPERSONIC FLOW
Filed Dec. 2, 1950

INVENTOR
GEORGE H. McLAFFERTY
BY Leonard F. Weklind
AGENT

United States Patent Office 2,811,828
Patented Nov. 5, 1957

2,811,828

BLEED MEANS FOR CONFINED SUPERSONIC FLOW

George H. McLafferty, Manchester, Conn., assignor to United Aircraft Corporation, East Hartford, Conn., a corporation of Delaware Application December 2, 1950, Serial No. 198,832

4 Claims. (Cl. 60—35.6)

This invention relates to fluid confining surfaces and more specifically to improve aperture or bleeding means cooperating therewith.

It is an object of this invention to provide a bleed mechanism for a fluid confining surface which is responsive to the relative Mach number of the fluid stream for permitting or restricting the bleeding operation.

Another object of this invention is to provide a fluid confining surface having improved bleed mechanism which bleeds fluid from the stream along the surface at subsonic flow and substantially restricts bleeding of fluid at supersonic flow.

Another object of this invention is to provide a mechanism of the type described which is readily adaptable to supersonic diffusers and comprises one or more fixed openings in the confining surface.

These and other objects of this invention will become readily apparent from the following detailed description of the accompanying drawings in which.

Figure 1:
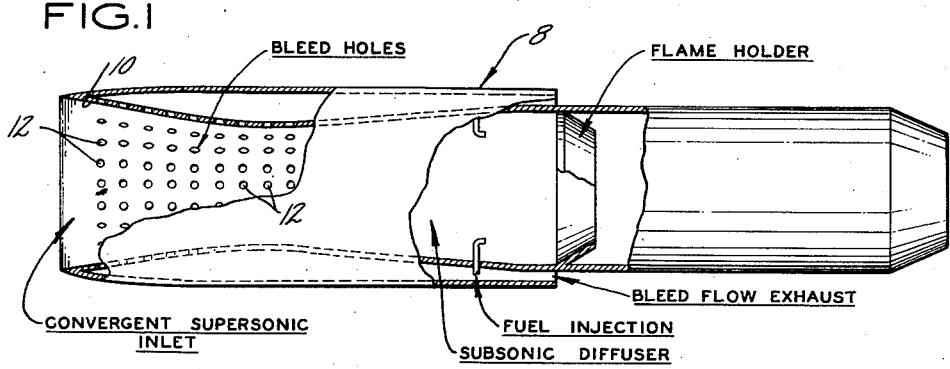
Fig. 1 is a partial cross-section of a ramjet having bleed passages therein.

In utilizing converging-diverging supersonic diffusers, as for example in the inlet duct for ramjet power plants as shown at 8 in Fig. 1, it becomes desirable or necessary to "swallow" the shock in the diffuser to insure a high total pressure recovery therein. Thus, when the velocity of the air relative to the missile approaches or surpasses sonic speed, various conditions of shock occur at the entrance thereto. With a detached shock for example, i. e., with the shock stabilized at some point just forward of the missile opening, a pressure rise occurs through the shock. However, this entails some losses which cannot be recovered in the air inlets so that maximum efficiency for the particular power plant is not realized.

It has become necessary then to bleed through the walls of the inlet ducts and diffusers a considerable quantity of air in order to have the shock swallowed, i. e., enter the inlet and have it move well back into the diffuser so that in spite of the variation in pressure through the shock any losses resulting therefrom are held to a minimum and maximum pressure recovery is obtained. In the case of a ramjet then, maximum thrust can be produced commensurate with this high pressure recovery and mass flow. Once the shock has been swallowed however, it is undesirable to bleed off any air from within the inlet or diffuser since this is apt to be lost and consumes appreciable power or energy. It should be borne in mind that the shock swallowed, i. e., located within the confines of the air inlet, will be in the form of a normal shock wherein upstream thereof the flow is supersonic and downstream thereof the flow is subsonic. Thus, as the swallowed shock moves downstream well into the confining passage, it will define the line between supersonic and subsonic flow.

Therefore, according to this invention a bleed passage or preferably a number of small passages are provided each of which passages is sensitive to subsonic or supersonic flow so as to permit bleeding through the walls of the passage or confining surface substantially only when the relative flow is subsonic.

Figure 2:
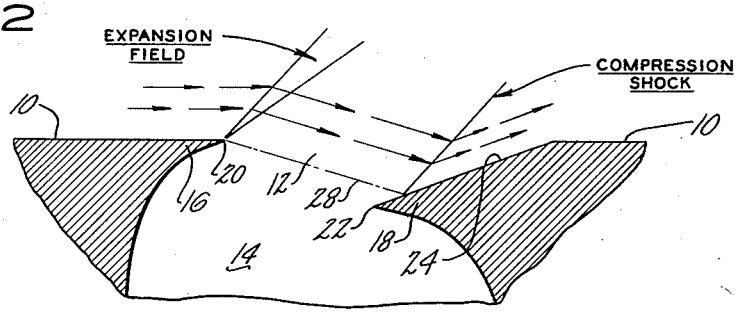
Fig. 2 is a detailed and simplified illustration of a confining surface and bleed aperture according to this invention.

At subsonic flow any fixed opening in the fluid confining surface will permit a certain amount of air to be bled from along the surface and away from the axis of the main stream. However at supersonic flow ordinary apertures restrict flow a relatively small amount. Hence the Fig. 2 illustration illustrates an aperture which at subsonic flow will permit air to be bled from along a confining surface substantially in the same quantity as a plane aperture. Herein a confining surface 10 is illustrated over which a fluid stream is adapted to flow. The surface 10 has an opening 12 therein which may lead to a bleed-off passage or chamber 14, the bleed-off fluid being conducted for exhaustion in any suitable manner. The upstream lip 16 and the downstream lip 18 are fixed relative to the surface 10 and cooperate to define the extent of the opening 12 along the axis of fluid flow. The upstream lip 16 may terminate in a downstream extremity 20 which is relatively sharp or which terminates abruptly. On the other hand the downstream lip 18 terminates in an upstream extremity 22 and includes a surface portion 24 which forms a reentrant angle with the confining surface 10.

In the case where the confined fluid has reached a supersonic velocity an expansion field will eminate from the downstream extremity 20 of the lip 16 so that a portion of the main stream will be deflected as it passes through the expansion field in a direction toward the opening 12 and away from the axis of flow. The amount of this deflection will of course depend upon the Mach number of the supersonic stream. Therefore, the stream line from immediately adjacent the confining surface 10 in being diverted over the lip 16 can be represented by the dotted line 28. It is then apparent that this stream line will be intercepted by the surface 24 of the lip 18 since the lip is substantially recessed relative to the confining surface. At the point of interception of the stream line 28 by the lip 18, a shock will be produced as illustrated due to the diverted stream being again deflected toward the axis of the stream. Although some energy of flow may be lost through this last mentioned compression shock, it is relatively small compared to the energy that may be lost by continued bleeding. It should also be noted that the compression shock mentioned here would be an oblique shock and would normally not shock down the stream sufficient to cause subsonic flow downstream thereof as would be the case of a normal shock mentioned previously herein.

Figure 3:
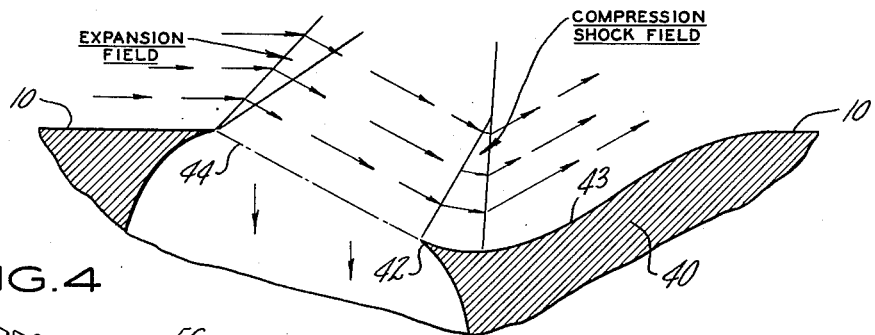
Fig. 3 is similar to Fig. 1 but illustrates a more accurate form of the invention.

Fig. 3 illustrates a more refined configuration of the Fig. 2 illustration in that the downstream lip 40 has its intercepting surface portion 42 at an angle with the axis of flow which is commensurate with the deflection angle of the stream as represented by the stream line 44. Thus the angle which the surface 42 makes with the confining surface 10 or the axis of flow is a function of the Mach number of the supersonic stream inasmuch as previously mentioned the deflection through the expansion field adjacent the upstream lip is proportional to the Mach number. In a ramjet missile or other vehicle a desired flight speed or normal operating range of flight speeds is chosen and the ramjet is designed accordingly. Hence the angle of the surface 42 relative to the surface 10 will be calculated to be an optimum for the given Mach number or range of Mach numbers which occurs within the supersonic diffuser. In missiles the flight Mach number is usually a predetermined desired constant.

The surface portion 43 is similar to surface portion 24 of Fig. 2 but is more rounded and merges smoothly with the surface 10 and surface portion 42. The reason for rounding out these surfaces is to minimize losses which occur when passing through the shock. By gradually (through a curved surface) turning the fluid rather than abruptly lower losses may be experienced. It should be added that the surface portion 24 (Fig. 2) and surface portion 43 (Fig. 3) will have a re-entrant angle with respect to the confining surface 10 which will be commensurate with the axial spacing of the apertures. It is desirable that the slope of surface 24 or 43 be as small as possible since smaller angles of turning for the intercepted flow produces smaller losses through the shock.

Figure 4:
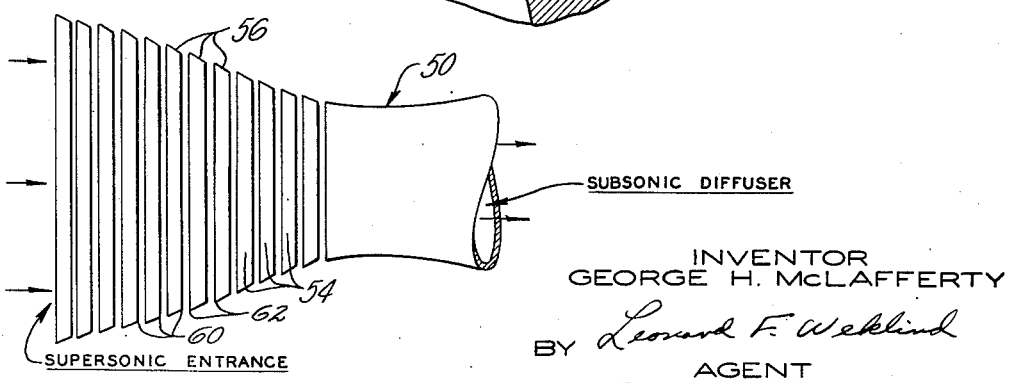
Fig. 4 illustrates a form of the invention as may be utilized in one type of supersonic diffuser.

As illustrated in Fig. 4, a supersonic diffuser 50 is illustrated which utilizes a plurality of axially spaced bleed passages of the type just described. As shown herein, the upstream or entrance portion of the diffuser may comprise a plurality of axially spaced rings 54 whose outermost peripheries 56 progressively define a converging diffuser passage. It should be noted however that each downstream lip 60 of the rings 54 is of a smaller diameter than the upstream lip 62 of the next adjacent ring in a downstream direction. It is then obvious htat the downstream taper of each individual ring is somewhat greater than the average converging taper of this portion of the diffuser. As a result, at supersonic flow the rings 54 cooperate to form openings therebetween which operate substantially as the openings described in connection with Figs. 2 and 3.

As a result of this invention it will be evident that an extremely simple yet highly efficient bleed mechanism has been provided for obtaining supersonic flow well within the confines of an inlet duct for a ramjet and the like while automatically preventing bleeding to a substantial extent when the flow within the duct becomes supersonic.

Although only certain embodiments of this invention have been illustrated and described herein, it will be evident that various changes and modifications will be made in the arrangement and construction of the various parts without departing from the scope of this novel concept.

What it is desired to obtain by Letters Patent is:

1. In a ramjet unit having an inlet diffuser and a burner section, and bleed means in said diffuser comprising a plurality of peripherally spaced apertures in the wall of said diffuser, said apertures comprising upstream and downstream lips defining the extent of the aperture along the axis of flow, the downstream lip being recessed from the wall of said diffuser and forming a re-entrant angle therewith.

2. In a fluid confining duct adapted to be exposed to a free stream of subsonic and supersonic velocities, means for bleeding fluid from the inner surface of said duct to encourage the swallowing of the shock created upon the free stream reaching relative sonic speed, comprising bleed mechanism in the wall of the duct whereby bleeding takes place at only subsonic velocities in the duct, said mechanism comprising at least one opening in the duct wall having upstream and downstream lips defining the extent of said opening and merging with the duct wall, the downstream lip being recessed from the wall away from the axis of the duct.

3. In a fluid confining surface over which a supersonic stream of predetermined Mach number is adapted to flow, an aperture in said surface, upstream and downstream lips defining the extent of said aperture along the axis of flow, said downstream lip being recessed from said surface, and a flow intercepting surface forming a portion of said lips, said intercepting surface comprising a first surface portion forming a re-entrant angle with said confining surface and a second surface portion at an angle to said first surface, said last mentioned angle being a function of the Mach number of the stream.

4. In a supersonic diffuser for a ramjet, bleed means in said diffuser comprising a plurality of apertures in the wall of said diffuser, said apertures comprising upstream and downstream lips defining the extent of the aperture along the axis of flow, the downstream lip being recessed from the wall of said diffuser and forming a re-entrant angle therewith.

References Cited in the file of this patent

UNITED STATES PATENTS

| 2,514,513 | Price | July 11, 1950 |
| 2,589,945 | Leduc | Mar. 18, 1952 |
| 2,631,425 | Nordfors | Mar. 17, 1953 |

FOREIGN PATENTS

| 439,805 | Great Britain | Dec. 6, 1935 |
| 614,548 | Great Britain | Dec. 17, 1948 |
| 50,033 | France | Aug. 1, 1939 |

(Addition to No. 779,655)